US011532069B2

(12) United States Patent
Hu et al.

(10) Patent No.: US 11,532,069 B2
(45) Date of Patent: Dec. 20, 2022

(54) METHOD FOR PROCESSING IMAGE, ELECTRONIC EQUIPMENT, AND STORAGE MEDIUM

(71) Applicants: XIAOMI TECHNOLOGY (WUHAN) CO., LTD., Wuhan (CN); BEIJING XIAOMI PINECONE ELECTRONICS CO., LTD., Beijing (CN)

(72) Inventors: Xian Hu, Wuhan (CN); Wei Deng, Wuhan (CN); Jun Yi, Wuhan (CN)

(73) Assignees: Xiaomi Technology (WUHAN) Co., Ltd., Wuhan (CN); Beijing Xiaomi Pinecone Electronics Co., Ltd., Beijing (CN)

( * ) Notice: Subject to any disclaimer, the term of this patent is extended or adjusted under 35 U.S.C. 154(b) by 39 days.

(21) Appl. No.: 17/334,926

(22) Filed: May 31, 2021

(65) Prior Publication Data
US 2022/0164920 A1 May 26, 2022

(30) Foreign Application Priority Data
Nov. 20, 2020 (CN) .......................... 202011314245.3

(51) Int. Cl.
*G06T 3/00* (2006.01)
*G06V 40/16* (2022.01)

(52) U.S. Cl.
CPC .......... *G06T 3/0056* (2013.01); *G06V 40/168* (2022.01)

(58) Field of Classification Search
CPC ........ G06T 3/0056; G06T 3/00; G06V 40/168
See application file for complete search history.

(56) References Cited

U.S. PATENT DOCUMENTS 6,016,148 A * 1/2000 Kang ...................... G06T 15/04
382/118
6,181,806 B1 * 1/2001 Kado ................... G06V 40/166
382/118
(Continued)

FOREIGN PATENT DOCUMENTS

CN 110049351 A 7/2019
EP 2706507 A1 3/2014

OTHER PUBLICATIONS

Wolberg, G, "Recent Advances in Image Morphing",Proceedings. Computer Graphics International, XX, XX, Jan. 1, 1996 (Jan. 1, 1996 ), pp. 64-71, XP001023723, (8 pages).
(Continued)

*Primary Examiner* — Anand P Bhatnagar
(74) *Attorney, Agent, or Firm* — Arch & Lake LLP

(57) ABSTRACT

At least two images are acquired. At least two crop images are acquired by cropping the at least two images for face-containing images. Triangular patch deformation is performed on two neighbour images, generating a first triangular patch deformation frame image sequence and a second triangular patch deformation frame image sequence. Similarity transformation is performed on each image sequence of the first triangular patch deformation frame image sequence, acquiring a first transform frame image sequence. Similarity transformation is performed on each image sequence of the second triangular patch deformation frame image sequence, acquiring a second transform frame image sequence. The first and the second transform frame image sequences are fused, acquiring a video frame sequence
(Continued)

corresponding to the two neighbour images. Of the at least two images, a video frame sequence generated by all neighbour images is coded, acquiring a destined video.

20 Claims, 3 Drawing Sheets

(56) References Cited

U.S. PATENT DOCUMENTS

| | | | | |
|---|---|---|---|---|
| 8,290,278 | B2* | 10/2012 | Matsuzaka | G06V 10/7557 382/209 |
| 10,812,791 | B2* | 10/2020 | Chien | H04N 19/105 |
| 11,421,905 | B2* | 8/2022 | Takayanagi | F24F 11/63 |
| 11,423,556 | B2* | 8/2022 | Yan | G06T 7/50 |
| 2010/0189361 | A1* | 7/2010 | Usui | G06V 10/7557 382/201 |
| 2010/0302643 | A1* | 12/2010 | Larreta | G03B 21/56 359/616 |
| 2013/0079911 | A1* | 3/2013 | Dong | G06T 13/40 345/589 |
| 2018/0084260 | A1* | 3/2018 | Chien | H04N 19/44 |
| 2021/0365707 | A1* | 11/2021 | Mao | G06K 9/627 |

OTHER PUBLICATIONS

Hall, V., "Morphing in 2-D and 3-D Where Image Processing Meets Computer Graphics" Dr. Dobb's Journal M&T Publ. Redwood City, CA, US, vol. 18, No. 7, Jul. 1, 1993 (Jul. 1, 1993 ), pp. 18-20, 22, 2, XP001023722, ISSN: 1044-789X, (9 pages).

Benson, et al., "Morph transformation of the facial image", Image and Vision Computing Elsevier Guildford GB vol. 12 No. 10 Dec. 1, 1994 (Dec. 1, 1994 ), pp. 691-696, XP026655934, ISSN:0262-8856, DOI: 10.1016/0262-8856(94)90044-2 [retrieved on Dec. 1, 1994], (6 pages).

Supplementary European Search Report in the European application No. 21176628.2, dated Nov. 25, 2021, (15 pages).

Xu, Yuanyuan, et al. "CenterFace: Joint Face Detection and Alignment Using Face as Point" [J]. entific Programming, 2020, 2020:1-8, (8 pages).

Guo, Xiaojie et al."PFLD: A Practical Facial Landmark Detector" [C]. CVPR 2019. (11 pages).

"Opencv Function Description" http://amroamroamro.github.io/mexopencv/matlab/cv.estimateAffinePartial2D.html, (2 pages).

Paper Animals "Delaunay Algorithm" https://blog.csdn.net/aaronmorgan/article/details/80389142, (23 pages).

Learn well JAVA "Affine Transformation is Performed on the Triangular Region of the Image" Nov. 24, 2019 https://blog.csdn.net/qq_45391763/article/details/103224822, (10 pages).

* cited by examiner

METHOD FOR PROCESSING IMAGE, ELECTRONIC EQUIPMENT, AND STORAGE MEDIUM

CROSS-REFERENCE TO RELATED APPLICATIONS

This application is based on, and claims the priority to, Chinese Application No. 202011314245.3 filed on Nov. 20, 2020. The content of the Chinese Application is hereby incorporated by reference in its entirety for all purposes.

BACKGROUND

Some electronic equipment support face transformation. A user may provide several images with faces to generate a high-quality face transform video automatically, providing a novel and fast face special effect experience, with controllable number of video frames and speed of face transformation. In a face transformation algorithm, when postures of two faces for transformation differ greatly, geometric transformation tends to lead to a great change in the location of a feature point, which may lead to phenomena such as overlap, misalignment, etc., resulting in an unstable region of a frame image generated by the transformation, as well as subtle jitters in a synthesized video, impacting user experience greatly.

SUMMARY

The present disclosure may relate to the field of image transform. The present disclosure provides a method for processing an image, electronic equipment, and a storage medium.

According to an aspect of examples of the present disclosure, there is provided a method for processing an image, including:

acquiring at least two images;

acquiring at least two crop images by cropping the at least two images for face-containing images;

of the at least two crop images, performing triangular patch deformation on a first image and a second image that neighbour each other, generating a first triangular patch deformation frame image sequence from the first image to the second image, and a second triangular patch deformation frame image sequence from the second image to the first image;

performing similarity transformation on each image sequence of the first triangular patch deformation frame image sequence, acquiring a first transform frame image sequence;

performing similarity transformation on each image sequence of the second triangular patch deformation frame image sequence, acquiring a second transform frame image sequence;

fusing the first transform frame image sequence and the second transform frame image sequence, acquiring a video frame sequence corresponding to the first image and the second image; and of the at least two crop images, coding a video frame sequence generated by all neighbour images, acquiring a destined video.

According to an aspect of examples of the present disclosure, there is provided electronic equipment including a processor and a memory for storing processor executable instructions. The processor may be configured to implement acquiring at least two images; acquiring at least two crop images by cropping the at least two images for face-containing images; of the at least two crop images, performing triangular patch deformation on a first image and a second image that neighbour each other, generating a first triangular patch deformation frame image sequence from the first image to the second image, and a second triangular patch deformation frame image sequence from the second image to the first image; performing similarity transformation on each image sequence of the first triangular patch deformation frame image sequence, acquiring a first transform frame image sequence; performing similarity transformation on each image sequence of the second triangular patch deformation frame image sequence, acquiring a second transform frame image sequence; fusing the first transform frame image sequence and the second transform frame image sequence, acquiring a video frame sequence corresponding to the first image and the second image; and of the at least two crop images, coding a video frame sequence generated by all neighbour images, acquiring a destined video.

According to an aspect of examples of the present disclosure, there is provided a non-transitory computer-readable storage medium having stored therein instructions which, when executed by a processor of electronic equipment, cause the electronic equipment to implement acquiring at least two images; acquiring at least two crop images by cropping the at least two images for face-containing images; of the at least two crop images, performing triangular patch deformation on a first image and a second image that neighbour each other, generating a first triangular patch deformation frame image sequence from the first image to the second image, and a second triangular patch deformation frame image sequence from the second image to the first image; performing similarity transformation on each image sequence of the first triangular patch deformation frame image sequence, acquiring a first transform frame image sequence; performing similarity transformation on each image sequence of the second triangular patch deformation frame image sequence, acquiring a second transform frame image sequence; fusing the first transform frame image sequence and the second transform frame image sequence, acquiring a video frame sequence corresponding to the first image and the second image; and of the at least two crop images, coding a video frame sequence generated by all neighbour images, acquiring a destined video.

It should be understood that the general description above and the detailed description below are illustrative and explanatory only, and do not limit the present disclosure.

BRIEF DESCRIPTION OF THE DRAWINGS

The accompanying drawings, which are incorporated in and form a part of this specification, illustrate examples consistent with the present disclosure and, together with the description, serve to explain the principles of the present disclosure.

DETAILED DESCRIPTION

Figure 1:
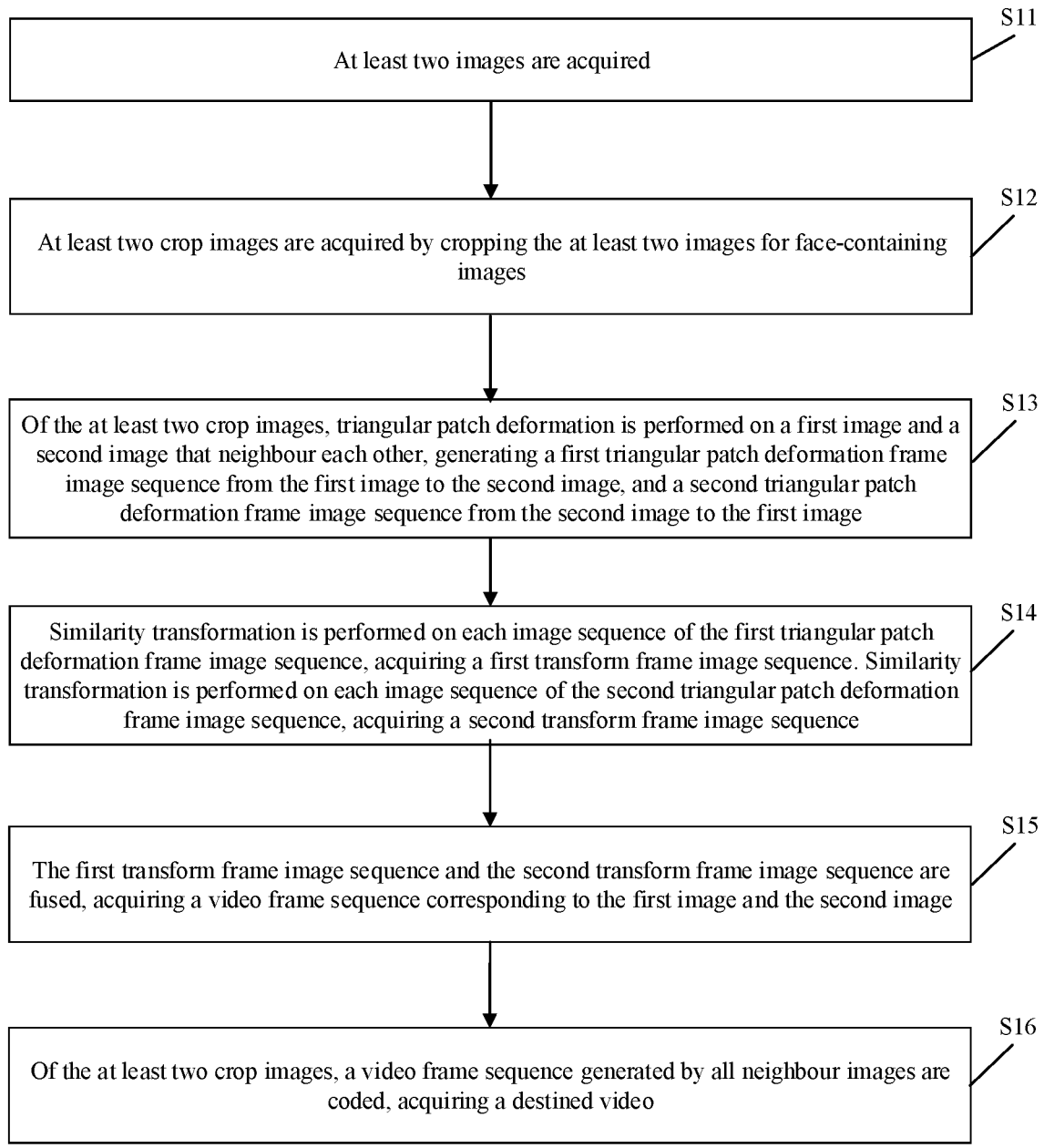
FIG. 1 is a flowchart of a method for processing an image according to examples of the present disclosure.

Reference will now be made in detail to illustrative examples, examples of which are illustrated in the accompanying drawings. The following description refers to the accompanying drawings in which the same numbers in different drawings represent the same or similar elements unless otherwise represented. The implementations set forth in the following description of illustrative examples do not represent all implementations consistent with the present disclosure. Instead, they are merely examples of devices and methods consistent with aspects related to the present disclosure. The illustrative implementation modes may take on multiple forms, and should not be taken as being limited to examples illustrated herein. Instead, by providing such implementation modes, examples herein may become more comprehensive and complete, and comprehensive concept of the illustrative implementation modes may be delivered to those skilled in the art. Implementations set forth in the following illustrative examples do not represent all implementations in accordance with the subject disclosure. Rather, they are merely examples of the apparatus and method in accordance with certain aspects herein.

Note that although a term such as first, second, third may be adopted in an example herein to describe various kinds of information, such information should not be limited to such a term. Such a term is merely for distinguishing information of the same type. For example, without departing from the scope of the examples herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of examples herein. However, those skilled in the art will know that the technical solutions of examples herein may be carried out without one or more of the details; alternatively, another method, component, device, option, etc., may be adopted. Under other conditions, no detail of a known structure, method, device, implementation, material or operation may be shown or described to avoid obscuring aspects of examples herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided therein that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

FIG. 1 is a flowchart of a method for processing an image according to examples of the present disclosure. As shown in FIG. 1, a method for processing an image according to examples of the present disclosure includes steps as follows.

In S11, at least two images are acquired.

In examples of the present disclosure, to perform face transformation, multiple face images to be transformed may be input. After acquiring the images, face recognition is performed on at least two images acquired to determine a face in the at least two images. Specifically, in examples of the present disclosure, an input face image is identified in order to detect whether there is a face in the image, and to determine whether the face in the image meets a corresponding requirement, for example, so as to select an image with a clear and complete face. The requirement may be, for example, whether a face detection frame output by face recognition intersects an image boundary, whether the size of a recognized face is too small, etc. A face image meeting a corresponding requirement is processed. That is, an image that does not meet the requirement is excluded. For example, an image that does not include a face, an image with a face detection frame output by face recognition intersecting an image boundary, an image in which the size of a recognized face is too small, etc. In examples of the present disclosure, a face in an image may be determined via the face recognition frame technology. Since the face is to be transformed, the image content unrelated to the face may be removed. That is, a face in an image may be recognized and cropped via the face detection frame technology. In examples of the present disclosure, it is also possible to recognize a remaining face in the image. When it is determined that the ratio of the region of a face to the entire image is too small, that is, when the face is too small, the small face is removed. When the face is small, the clarity of the small face inevitably fails to meet a requirement for being viewed, and a rendering effect of a transform video resulting from transforming such a face will be poor. Therefore, when an image is preprocessed, such a small face image is to be removed.

In examples of the present disclosure, a CenterFace network may be used to detect a face in the at least two images to determine whether a face image is included, whether an included face image meets a processing requirement, etc.

As an implementation, when two or more faces are included in the image, a face located at the center of the image or a face located with a minimum deviation from the center is taken as an effective face. The effective face is determined as a face to be processed. In examples of the present disclosure, only one face image is kept in an image by re-cropping the image including multiple faces.

In S12, at least two crop images are acquired by cropping the at least two images for face-containing images.

Specifically, feature points of a face contained in the at least two images may be determined. A first region may be determined based on the feature points for the face-containing images in the at least two images. The at least two crop images may be acquired by cropping the face-containing images based on the first region.

In examples of the present disclosure, after a face image in an image input by a user has been determined, feature points in the face are to be identified. In examples of the present disclosure, processing is to be focused on the feature points in the face when face transformation is performed. For a viewer, the effect of display of the feature points in the face determines the effect of display of the face. Related transformation is to be performed on the feature points in the face to render a transform video more stable and with improved transform effect.

In examples of the present disclosure, feature points in a face may include a front feature point such as an eye, a nose tip, a mouth corner point, an eyebrow, a cheek, etc., and may also include a contour point such as an eye, a nose, lips, an eyebrow, a cheek, etc. Of course, if the image includes that of an ear, etc., the ear and a contour point thereof may be determined as a feature point of the face.

The first region may be determined based on the feature points. The face-containing images may be cropped based on the first region and the size of the destined object. The crop image may be scaled to the size of the destined object.

In examples of the present disclosure, the first region may be determined based on the feature points as follows.

A circumscription frame circumscribing the feature points may be determined according to location information of the feature points. A width of the first region may be determined according to a center point of the circumscription frame and an image width boundary of the face to be processed. A height of the first region may be determined according to a preset aspect ratio and the width of the first region. The circumscription frame may be a rectangular circumscription frame, a circular circumscription frame, or a polygonal circumscription frame, etc., as long as a clear face image may be acquired. Try to locate a face at the center of the image in a non-deformable manner. The specific shape of the circumscription frame is not limited in examples of the present disclosure.

In examples of the present disclosure, taking a rectangular circumscription frame as an example, the rectangular circumscription frame circumscribing feature points of the face are determined according to coordinates of the feature points in the face image. The width and the height of the rectangular frame of the face are denoted by W, h, respectively. In examples of the present disclosure, a Practical Facial Landmark Detectorlink (PFLD) network may be used to locate a landmark of a crop face image to determine the feature points of the face. Coordinates of the center of the rectangular frame of the face are denoted by $(x_d, y_c)$. The width and the height of the source image are $w_{src}$ and $h_{src}$, respectively. The destined width and height of the ultimate generated video are denoted by $w_{dst}$ and $h_{dst}$. The distances from the center of the rectangular frame of the face to the left boundary and the right boundary of the image. If the center of the rectangular frame of the face is close to the left boundary, the distance to the left boundary is maintained, and the image is cropped to acquire a width of $w_{crop}=2\times x_c$ (corresponding to the first region). If the center of the rectangular frame of the face is close to the right boundary, the distance to the right boundary is maintained, and the image is cropped to acquire a width of $w_{crop}=2\times(w_{src}-x_c)$ (corresponding to the first region). In the foregoing example, as an example, in the coordinate system, the bottom left vertex of the rectangular frame of the face is taken as the origin.

If the destined aspect ratio of the output image is denoted by $r_{dst}$, then $$r_{dst} = \frac{w_{dst}}{h_{dst}}.$$

The height of the crop image (corresponding to the first region) is computed as $$h_{crop} = \frac{w_{crop}}{r_{dst}}.$$

As an implementation, the image may be cropped first in the height direction. That is, referring to the closest of the distances from the center to the upper boundary and the lower boundary of the image, the image is cropped at the opposite side. The to-be-processed crop image is scaled using a scaling ratio computed with the height and the height of the destined image.

In an implementation, if the width and the height of the first region do not meet the destined width and height, the image acquired may be cropped via the first region, and scaled to the width $w_{dst}$ and the height $h_{dst}$.

It should be noted that by cropping a face image according to the above cropping rule, the face may be made to be located as close to the center of the image as possible without distorting and deforming the face, which meets popular aesthetics.

In S13, of the at least two crop images, triangular patch deformation is performed on a first image and a second image that neighbour each other, generating a first triangular patch deformation frame image sequence from the first image to the second image, and a second triangular patch deformation frame image sequence from the second image to the first image.

In examples of the present disclosure, according to a first coordinate set of feature points of a face of the first image and a second coordinate set of feature points of a face of the second image, a second similarity transformation matrix and a first similarity transformation matrix between the first coordinate set and the second coordinate set may be computed.

A first location difference between a feature point of the first image transformed by the first similarity transformation matrix and a corresponding feature point of the second image may be determined. A second location difference between a feature point of the second image transformed by the second similarity transformation matrix and a corresponding feature point of the first image may be determined.

A first feature point location track from the first image to the second image may be computed according to the first location difference. A second feature point location track from the second image to the first image may be computed according to the second location difference.

The first triangular patch deformation frame image sequence may be acquired according to the first feature point location track. The second triangular patch deformation frame image sequence may be acquired according to the second feature point location track.

The first feature point location track from the first image to the second image may be computed according to the first location difference as follows.

The first feature point location track may be computed as:

$$s_{i:A \to B} = \frac{i}{N} \times D_{A \to B} + s_A.$$

The $s_{i:A \to B}$ may be the first feature point location track. The N may be a number of transform frames transforming the first image into the second image. The i may be an ith frame image in transform image frames. The i may be an integer greater than 0 and less than or equal to the N. The $s_A$ may be the first coordinate set. The $D_{A \to B}$ may be the first location difference.

The second feature point location track from the second image to the first image may be computed according to the second location difference as follows.

The second feature point location track may be computed as:

$$s_{i:B \to A} = \frac{i}{N} \times D_{B \to A} + s_B.$$

The $s_{i:B \to A}$ may be the second feature point location track. The $s_B$ may be the second coordinate set. The $D_{B \to A}$ may be the second location difference.

In examples of the present disclosure, the first image and the second image that neighbour each other may be images A and B, respectively, for example, merely to illustrate the nature of the technical solution of examples of the present disclosure, instead of limiting the technical means thereof.

Specifically, after the acquired images have been cropped, triangular patch deformation are performed on neighbour images in the images, to generate, for all neighbour images such as the neighbour images A and B, a triangular patch deformation frame image sequence from image A to image B and a triangular patch deformation frame image sequence from image B to image A, specifically as follows.

According to coordinate sets of feature points of faces of images A and B, denoted by $s_A = \{s_{a_1}, s_{a_2}, \ldots, s_{a_n}\}$ (corresponding to the first coordinate set) and $s_B = \{s_{b_1}, s_{b_2}, \ldots, s_{b_n}\}$ (corresponding to the second coordinate set), respectively, the n denoting the number of the feature points, the similarity transformation matrix between $s_A$ and $s_B$, i.e., the similarity transformation matrix between two neighbour face images A and B, including the similarity transformation matrix from A to B (corresponding to the first similarity transformation matrix) and the similarity transformation matrix from B to A (corresponding to the second similarity transformation matrix), denoted by $T_{A \to B}$ and $T_{B \to A}$, respectively, may be solved using a similarity transformation solution such as an estimateAffinePartial2D function method (as an implementation). The difference between the location of a feature point on image A, subject to similarity transformation, and the location of a corresponding feature point on image B, denoted by A→B (corresponding to the first location difference), is computed as:

$$D_{A \to B} s_A \times T_{A \to B} - s_B.$$

Similarly, the difference between the location of a feature point on image B, subject to similarity transformation, and the location of a corresponding feature point on image A, denoted by $D_{B \to A}$ (corresponding to the second location difference), is computed as:

$$D_{B \to A} = s_B \times T_{B \to A} - s_A$$

The destined location track of the triangle change of the feature points is acquired by breaking down the difference in the location by frame. Assume that a set number of N transform image frames (corresponding to the number of transform frames) are generated between A and B. As an implementation, the N may take values 25, 30, 35, 40, etc. Then, the feature point location track (corresponding to the first feature point location track) transforming the face image A to the face image B may be computed according to $D_{A \to B}$, as:

$$s_{i:A \to B} = \frac{i}{N} \times D_{A \to B} + s_A$$

The $s_{i:A \to B}$ denotes the location of the feature point of the ith frame image transforming A into B by triangular deformation. The i is an integer greater than 0 and less than or equal to the N. Similarly, the feature point location track (corresponding to the second feature point location track) transforming the face image B to the face image A may be computed according to $D_{B \to A}$, as:

$$s_{i:B \to A} = \frac{i}{N} \times D_{B \to A} + s_B$$

The $s_{i:B \to A}$ denotes the location of the feature point of the ith frame image transforming B into A by triangular deformation.

Triangular patch partitioning is performed using a triangular patch partitioning method according to the feature point location track $s_{i:A \to B}$ transforming the image A into the image B by triangular patch deformation. In examples of the present disclosure, with the triangular patch deformation partitioning method, a delaunay triangulated graph algorithm may be used to triangulate the image. In order to ensure synchronous deformation of the background and the face, midpoints of the four sides and four vertices of the image A are respectively included in a total of N+8 points to triangulate the image A (including the face and the background). A feature point on image A is deformed to a destined location track using the triangular patch deformation method, acquiring a deformation frame image sequence from the image A to the image B, denoted by $F_{A \to B} = \{f_1, f_2, \ldots, f_N\}$. The $f_i$ denotes the ith frame image acquired by performing triangle deformation from the image A.

Similarly, a deformation frame image sequence from the image B to the image A, denoted by $H_{B \to A} = \{h_1, h_2, \ldots, h_N\}$, is acquired according to the feature point location track $s_{i:B \to A}$ transforming the image B into the image A. The $h_i$ denotes the ith frame image acquired by performing triangle deformation from the image B. The N denotes the number of frame images generated by transforming the image A into the image B or transforming the image B to the image A.

In S14, similarity transformation is performed on each image sequence of the first triangular patch deformation frame image sequence, acquiring a first transform frame image sequence. Similarity transformation is performed on each image sequence of the second triangular patch deformation frame image sequence, acquiring a second transform frame image sequence.

Similarity transformation may be performed on each image sequence of the first triangular patch deformation frame image sequence, acquiring the first transform frame image sequence, as follows.

A first similarity transformation matrix transforming the first image into the second image may be determined.

A step interval of a first transform parameter of the first similarity transformation matrix may be determined according to a number of transform frames transforming the first image into the second image.

A first similarity transformation sub-matrix for each transform frame image sequence of the first transform frame image sequence may be computed based on the first similarity transformation matrix and the step interval of the first transform parameter.

The first transform frame image sequence may be acquired by performing multiplication on each triangular patch deformation frame image in the first triangular patch deformation frame image sequence according to the first similarity transformation sub-matrix.

Similarity transformation may be performed on each image sequence of the second triangular patch deformation frame image sequence, acquiring the second transform frame image sequence, as follows.

A second similarity transformation sub-matrix may be acquired by performing inverse transformation on the first similarity transformation sub-matrix. The second transformation frame image sequence may be acquired by performing multiplication on each triangular patch deformation frame image in the second triangular patch deformation frame image sequence according to the second similarity transformation sub-matrix.

Alternatively, the second transform frame image sequence may be acquired as follows.

A second similarity transformation matrix transforming the second image into the first image may be determined.

A step interval of a second transform parameter of the second similarity transformation matrix may be determined according to a number of transform frames transforming the second image into the first image.

A second similarity transformation sub-matrix for each transform frame image sequence of the second transform frame image sequence may be computed based on the second similarity transformation matrix and the step interval of the second transform parameter.

The second transformation frame image sequence may be acquired by performing multiplication on each triangular patch deformation frame image in the second triangular patch deformation frame image sequence according to the second similarity transformation sub-matrix.

In examples of the present disclosure, as transformation between two images frames is to be implemented through image frames, the number of transform frames transforming the second image into the first image is the same as the number of transform frames transforming the first image into the second image.

The similarity transformation matrix $T_{B \to A}$ (corresponding to the second similarity transformation matrix) transforming the image B into the image A may be expressed as:

$$T_{B \to A} = \begin{bmatrix} s*r_{11} & s*r_{12} & t_x \\ s*r_{21} & s*r_{22} & t_y \\ 0 & 0 & 1 \end{bmatrix}$$

The s denotes a scaling factor. The $r_{11}$, $r_{12}$, $r_{21}$, and $r_{22}$ denote rotation factors. The $t_x$ and the $t_y$ denote translation factors.

A matrix parameter is decomposed, acquiring a parameter step interval for each frame transformation. The parameter (corresponding to the second transformation parameter) may include a scaling parameter, a rotation parameter, a translation parameter, etc. The computation formula is as follows:

$$\Delta_s = e^{-\log(s/N)}$$

The $\Delta_s$ denotes the step interval of the scaling parameter. The e is the constant in the logarithm operation.

$$\theta = \arctan\left(\frac{r_{21}}{r_{11}}\right)$$

$$\Delta_r = -\frac{\theta}{N}$$

The $\Delta_r$ denotes a parameter step interval of the scaling parameter. The θ denotes a rotation angle corresponding to the rotation parameters.

$$\Delta_{t_x} = -\frac{t_x}{N}$$

$$\Delta_{t_y} = -\frac{t_y}{N}$$

The $\Delta_{t_x}$ and the $\Delta_{t_y}$ denote parameter step intervals of the translation parameters in the x direction and the y direction, respectively.

The similarity transformation matrix, corresponding to each frame similarity transformation transforming the image B into the image A, is solved according to the parameter step intervals of each frame transformation described above, with a specific construction as follows:

$$T_{i:B \to A} = \begin{bmatrix} (s \times \Delta_s^i) \times \cos(\theta + \Delta_r \times i) & (s \times \Delta_s) \times \sin(\theta + \Delta_r \times i) & t_x + \Delta_{t_x} \times i \\ -(s \times \Delta_s^i) \times \sin(\theta + \Delta_r \times i) & (s \times \Delta_s) \times \cos(\theta + \Delta_r \times i) & t_y + \Delta_{t_y} \times i \\ 0 & 0 & 1 \end{bmatrix}$$

The $T_{i:B \to A}$ denotes the similarity transformation matrix (corresponding to the second similarity transformation sub-matrix) corresponding to similarity transformation transforming the image B into the ith frame of A. The similarity transformation matrix (corresponding to the first similarity transformation sub-matrix) corresponding to similarity transformation transforming the image A into the ith frame of B may further be acquired based on $T_{i:B \to A}$, as follows:

$$T_{i:a \to B} = T_{i:B \to A} \times T_{B \to A}^{-1}$$

The $T_{i:A \to B}$ denotes the similarity transformation matrix (corresponding to the second similarity transformation sub-matrix) corresponding to transforming the image A into the ith frame of the image B. The $T_{B \to A}^{-1}$ denotes the inverse matrix of the similarity transformation matrix $T_{B \to A}$ transforming the image B into the A. It should be noted that the similarity transformation matrix corresponding to transforming the image B into the ith frame of the image A may be determined based on the inverse matrix of the similarity transformation matrix corresponding to transforming the image A into the ith frame of the image B. Alternatively, the similarity transformation matrix corresponding to transforming the image B into the ith frame of the image A may be computed in the mode of computing the inverse matrix of the similarity transformation matrix corresponding to transforming the image A into the ith frame of the image B, details of which is not repeated.

A similarity transformation frame image sequence $FT_{A \to B} = \{ft_1, ft_2, \ldots, ft_N\}$ is acquired by performing similarity transformation on the ith frame of the deformation frame image sequence $F_{A \to B}$ according to $T_{i:A \to B}$. The $ft_i$ denotes the ith frame image acquired by transforming the image A. Similarly, a similarity transformation frame image sequence $HT_{B \to A} = \{ht_1, ht_2, \ldots, ht_N\}$ is acquired by performing similarity transformation on the ith frame of the deformation frame image sequence $H_{B \to A}$ according to $T_{i:B \to A}$. The $ht_i$ denotes the ith frame image acquired by transforming the image B.

In S15, the first transform frame image sequence and the second transform frame image sequence are fused, acquiring a video frame sequence corresponding to the first image and the second image.

The first transform frame image sequence and the second transform frame image sequence may be fused as follows.

A first weight and a second weight may be determined. The first weight may be a weight of an ith frame image of the first transform frame image sequence during fusion. The second weight may be a weight of an ith frame image of the second transform frame image sequence during fusion. The i may be greater than 0 and less than or equal to a number of frames of the first transform frame image sequence.

Each pixel of the ith frame image of the first transform frame image sequence may be multiplied by the first weight, acquiring a first to-be-fused image. The ith frame image of the second transform frame image sequence may be multiplied by the second weight, acquiring a second to-be-fused image.

Each pixel in the first to-be-fused image and each pixel in the second to-be-fused image may be superimposed, respectively, acquiring an ith frame fusion image corresponding to the ith frame image of the first transform frame image sequence and the ith frame image of the second transform frame image sequence.

All fusion images corresponding to the first transform frame image sequence and the second transform frame image sequence may form the video frame sequence.

Specifically, image fusion is performed on the transform frame image sequence $FT_{A \to B}$ (corresponding to the first transform frame image sequence) from image A to image B and the transform frame image sequence $HT_{B \to A}$ (corresponding to the second transform frame image sequence) from image B to image A, acquiring the video frame sequence, denoted by $Q=\{q_1, q_2, \ldots, q_N\}$ (corresponding to the video frame sequence corresponding to the first image and the second image). The $q_i$ denotes the ith frame image of the video frame sequence. Then, a fusion formula may be expressed as:

$$w_i = \frac{1}{e^{8 * \frac{i}{N} - 4}}$$

$$q_i = w \times ft_i + (1-w) \times ht_i$$

The $w_i$ denotes the weight of the weighted fusion. The non-linear design of the $w_i$ may make the fusion process uneven, and the generated transform video more rhythmic.

In S16, of the at least two crop images, a video frame sequence generated by all neighbour images are coded, acquiring a destined video.

In examples of the present disclosure, a video frame sequence generated by all neighbour images, such as the image sequence Q generated by the images A and B, are coded according to a set frame rate to synthesize a final face transform special-effect video.

The technical solution of examples of the present disclosure may be applied to various face transformation applications. A user may input a profile image per se and an image of a transform object such as a star. With the method for processing an image of examples of the present disclosure, the profile image of the user may be transformed gradually into the profile image of the star by video transformation. The user may also input any profile image. For example, the user may input a profile image from the infancy, the childhood, teenage, adulthood, . . . , till the current period of the user per se, respectively. With the method for processing an image of examples of the present disclosure, the user may view a video of the user per se gradually transforming from the infancy to the current image, by transplanting the technical solution of examples of the present disclosure to electronic equipment such as a mobile phone, a notebook computer, a game machine, a tablet computer, a personal digital assistant, a television, etc.

Figure 2:
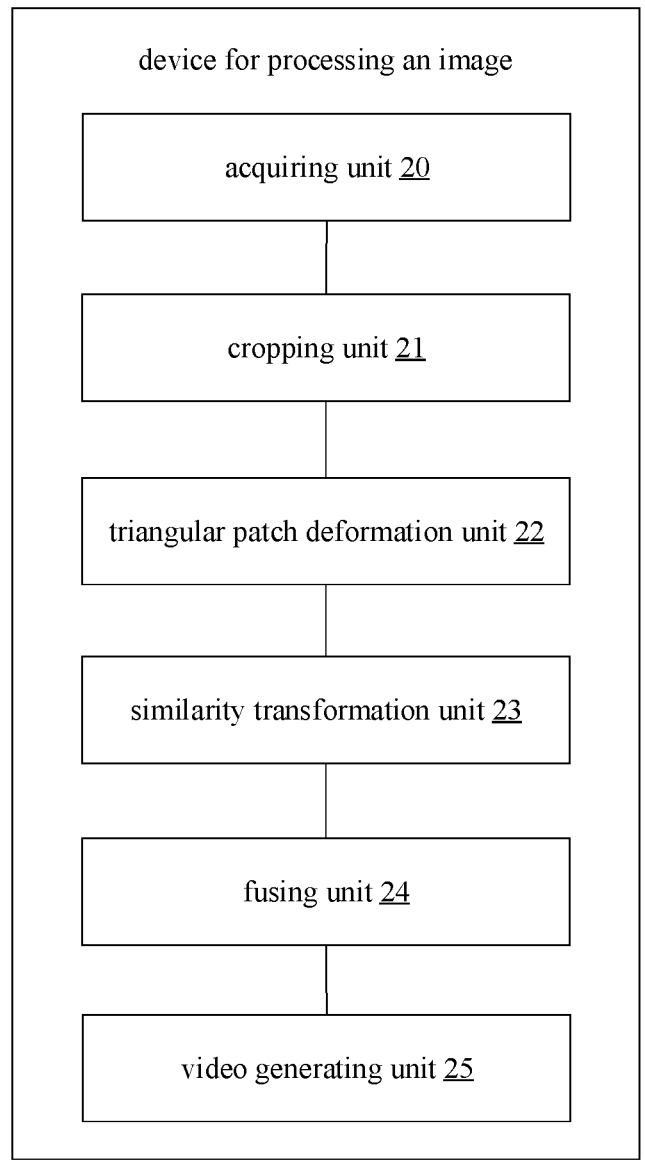
FIG. 2 is a schematic diagram of a structure of a device for processing an image according to examples of the present disclosure.

FIG. 2 is a schematic diagram of a structure of a device for processing an image according to examples of the present disclosure. As shown in FIG. 2, the device for processing an image according to examples of the present disclosure includes a unit as follows.

An acquiring unit 20 is configured to acquire at least two images.

A cropping unit 21 is configured to acquire at least two crop images by cropping the at least two images for face-containing images.

A triangular patch deformation unit 22 is configured to, of the at least two crop images, perform triangular patch deformation on a first image and a second image that neighbour each other, generating a first triangular patch deformation frame image sequence from the first image to the second image, and a second triangular patch deformation frame image sequence from the second image to the first image.

A similarity transformation unit 23 is configured to perform similarity transformation on each image sequence of the first triangular patch deformation frame image sequence, acquiring a first transform frame image sequence; and perform similarity transformation on each image sequence of the second triangular patch deformation frame image sequence, acquiring a second transform frame image sequence.

A fusing unit 24 is configured to fuse the first transform frame image sequence and the second transform frame image sequence, acquiring a video frame sequence corresponding to the first image and the second image.

A video generating unit 25 is configured to, of the at least two crop images, code a video frame sequence generated by all neighbour images, acquiring a destined video.

As an implementation, the cropping unit 21 is further configured to:

determine feature points of a face contained in the at least two images;

determine a first region based on the feature points for the face-containing images in the at least two images; and acquire the at least two crop images by cropping the face-containing images based on the first region.

As an implementation, the cropping unit 21 is further configured to:

determine a circumscription frame circumscribing the feature points according to location information of the feature points;

determine a width of the first region according to a center point of the circumscription frame and an image width boundary of the face to be processed; and determine a height of the first region according to a preset aspect ratio and the width of the first region.

As an implementation, the triangular patch deformation unit 22 is further configured to:

compute, according to a first coordinate set of feature points of a face of the first image and a second coordinate set of feature points of a face of the second image, a second similarity transformation matrix and a first similarity transformation matrix between the first coordinate set and the second coordinate set;

determine a first location difference between a feature point of the first image transformed by the first similarity transformation matrix and a corresponding feature point of the second image; and determine a second location difference between a feature point of the second image transformed by the second similarity transformation matrix and a corresponding feature point of the first image;

compute a first feature point location track from the first image to the second image according to the first location difference; and compute a second feature point location track from the second image to the first image according to the second location difference; and acquire the first triangular patch deformation frame image sequence according to the first feature point location track, and acquire the second triangular patch deformation frame image sequence according to the second feature point location track.

As an implementation, the triangular patch deformation unit 22 is further configured to:

compute the first feature point location track as:

$$s_{i:A \to B} = \frac{1}{N} \times D_{A \to B} + s_A.$$

The $s_{i:A \to B}$ is the first feature point location track. The N is a number of transform frames transforming the first image into the second image. The i is an ith frame image in transform image frames. The i is an integer greater than 0 and less than or equal to the N. The $s_A$ is the first coordinate set. The $D_{A \to B}$ is the first location difference, The triangular patch deformation unit is further configured to compue the second feature point location track as:

$$s_{i:B \to A} = \frac{1}{N} \times D_{B \to A} + s_B.$$

The $s_{i:B \to A}$ is the second feature point location track. The $s_B$ is the second coordinate set. The $D_{B \to A}$ is the second location difference.

As an implementation, the similarity transformation unit 23 is further configured to:

determine a first similarity transformation matrix transforming the first image into the second image;

determine a step interval of a first transform parameter of the first similarity transformation matrix according to a number of transform frames transforming the first image into the second image;

compute a first similarity transformation sub-matrix for each transform frame image sequence of the first transform frame image sequence based on the first similarity transformation matrix and the step interval of the first transform parameter; and acquire the first transform frame image sequence by performing multiplication on each triangular patch deformation frame image in the first triangular patch deformation frame image sequence according to the first similarity transformation sub-matrix.

The similarity transformation unit 23 may be further configured to:

acquire a second similarity transformation sub-matrix by performing inverse transformation on the first similarity transformation sub-matrix; and acquire the second transformation frame image sequence by performing multiplication on each triangular patch deformation frame image in the second triangular patch deformation frame image sequence according to the second similarity transformation sub-matrix.

Alternatively, the similarity transformation unit may be further configured to:

determine a second similarity transformation matrix transforming the second image into the first image; determine a step interval of a second transform parameter of the second similarity transformation matrix according to a number of transform frames transforming the second image into the first image; compute a second similarity transformation sub-matrix for each transform frame image sequence of the second transform frame image sequence based on the second similarity transformation matrix and the step interval of the second transform parameter; and acquire the second transformation frame image sequence by performing multiplication on each triangular patch deformation frame image in the second triangular patch deformation frame image sequence according to the second similarity transformation sub-matrix.

As an implementation, the fusing unit 24 is further configured to:

determine a first weight and a second weight, the first weight being a weight of an ith frame image of the first transform frame image sequence during fusion, the second weight being a weight of an ith frame image of the second transform frame image sequence during fusion, the i being greater than 0 and less than or equal to a number of frames of the first transform frame image sequence;

multiply each pixel of the ith frame image of the first transform frame image sequence by the first weight, acquiring a first to-be-fused image; multiply the ith frame image of the second transform frame image sequence by the second weight, acquiring a second to-be-fused image; and respectively superimpose each pixel in the first to-be-fused image and each pixel in the second to-be-fused image, acquiring an ith frame fusion image corresponding to the ith frame image of the first transform frame image sequence and the ith frame image of the second transform frame image sequence.

All fusion images corresponding to the first transform frame image sequence and the second transform frame image sequence may form the video frame sequence.

As an implementation, the feature points include at least one of:

an eye, a nose tip, a mouth corner point, an eyebrow, a cheek, and a contour point of an eye, a nose, lips, an eyebrow, and a cheek.

In an example, the determining unit 20, the cropping unit 21, the triangular patch deformation unit 22, the similarity transformation unit 23, the fusing unit 24, and the video generating unit 25, etc., may be implemented by one or more Central Processing Units (CPU), Graphics Processing Units (GPU), base processors (BP), Application Specific Integrated Circuits (ASIC), DSPs, Programmable Logic Devices (PLD), Complex Programmable Logic Devices (CPLD), Field-Programmable Gate Arrays (FPGA), general purpose processors, controllers, Micro Controller Units (MCU), Microprocessors, or other electronic components, or may be implemented in conjunction with one or more radio frequency (RF) antennas, for performing the foregoing text processing device.

A module as well as unit of the device for processing an image according to an aforementioned example herein may perform an operation in a mode elaborated in an aforementioned example of the device herein, which will not be repeated here.

Figure 3:
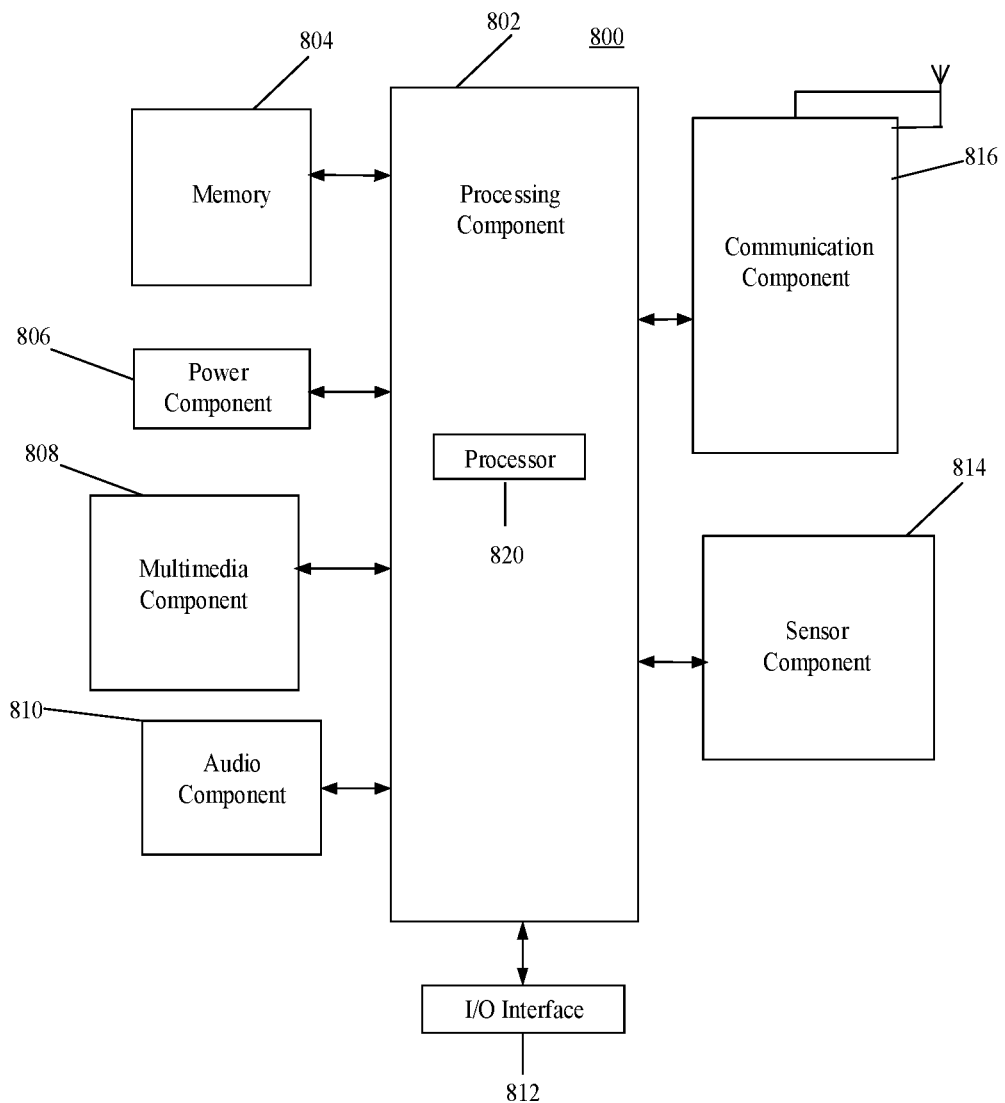
FIG. 3 is a block diagram of electronic equipment according to examples of the present disclosure.

FIG. 3 is a block diagram of electronic equipment 800 according to an illustrative example. As shown in FIG. 3, the electronic equipment 800 supports multi-screen output. The electronic equipment 800 may include one or more components as follows: a processing component 802, a memory 804, a power component 806, a multimedia component 808, an audio component 810, an Input/Output (I/O) interface 812, a sensor component 814, and a communication component 816.

The processing component 802 generally controls an overall operation of the display equipment, such as operations associated with display, a telephone call, data communication, a camera operation, a recording operation, etc. The processing component 802 may include one or more processors 820 to execute instructions so as to complete all or some steps of the method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operation on the electronic equipment 800. Examples of these data include instructions of any application or method configured to operate on the electronic equipment 800, contact data, phonebook data, messages, images, videos, and/or the like. The memory 804 may be realized by any type of volatile or non-volatile storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 806 supplies electric power to various components of the electronic equipment 800. The power component 806 may include a power management system, one or more power supplies, and other components related to generating, managing and distributing electric power for the electronic equipment 800.

The multimedia component 808 includes a screen providing an output interface between the electronic equipment 800 and a user. The screen may include a Liquid Crystal Display (LCD) and a Touch Panel (TP). If the screen includes a TP, the screen may be realized as a touch screen to receive an input signal from a user. The TP includes one or more touch sensors for sensing touch, slide and gestures on the TP. The touch sensors not only may sense the boundary of a touch or slide move, but also detect the duration and pressure related to the touch or slide move. In some examples, the multimedia component 808 includes a front camera and/or a rear camera. When the electronic equipment 800 is in an operation mode such as a shooting mode or a video mode, the front camera and/or the rear camera may receive external multimedia data. Each of the front camera and/or the rear camera may be a fixed optical lens system or may have a focal length and be capable of optical zooming.

The audio component 810 is configured to output and/or input an audio signal. For example, the audio component 810 includes a microphone (MIC). When the electronic equipment 800 is in an operation mode such as a call mode, a recording mode, and a voice recognition mode, the MIC is configured to receive an external audio signal. The received audio signal may be further stored in the memory 804 or may be sent via the communication component 816. In some examples, the audio component 810 further includes a loudspeaker configured to output the audio signal.

The I/O interface 812 provides an interface between the processing component 802 and a peripheral interface module. The peripheral interface module may be a keypad, a click wheel, a button, etc. These buttons may include but are not limited to: a homepage button, a volume button, a start button, and a lock button.

The sensor component 814 includes one or more sensors for assessing various states of the electronic equipment 800. For example, the sensor component 814 may detect an on/off state of the electronic equipment 800 and relative locationing of components such as the display and the keypad of the electronic equipment 800. The sensor component 814 may further detect a change in the location of the electronic equipment 800 or of a component of the electronic equipment 800, whether there is contact between the electronic equipment 800 and a user, the orientation or acceleration/deceleration of the electronic equipment 800, and a change in the temperature of the electronic equipment 800. The sensor component 814 may include a proximity sensor configured to detect existence of a nearby object without physical contact. The sensor component 814 may further include an optical sensor such as a Complementary Metal-Oxide-Semiconductor (CMOS) or Charge-Coupled-Device (CCD) image sensor used in an imaging application. In some examples, the sensor component 814 may further include an acceleration sensor, a gyroscope sensor, a magnetic sensor, a pressure sensor, or a temperature sensor.

The communication component 816 is configured to facilitate wired or wireless/radio communication between the electronic equipment 800 and other equipment. The electronic equipment 800 may access a radio network based on a communication standard such as WiFi, 2G, 3G, . . . , or a combination thereof. In an illustrative example, the communication component 816 broadcasts related information or receives a broadcast signal from an external broadcast management system via a broadcast channel. In an illustrative example, the communication component 816 further includes a Near Field Communication (NFC) module for short-range communication. For example, the NFC module may be realized based on Radio Frequency Identification (RFID), Infrared Data Association (IrDA), Ultra-WideBand (UWB) technology, BlueTooth (BT) technology, and other technologies.

In an illustrative example, the electronic equipment 800 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components, to implement the method.

In an illustrative example, a non-transitory computer-readable storage medium including instructions, such as the memory 804 including instructions, is further provided. The instructions may be executed by the processor 820 of the electronic equipment 800 to implement a step of the method for processing an image of an example herein. For example, the non-transitory computer-readable storage medium may be a Read-Only Memory (ROM), a Random Access Memory (RAM), a Compact Disc Read-Only Memory (CD-ROM), a magnetic tape, a floppy disk, optical data storage equipment, etc.

Examples of the present disclosure further disclose a non-transitory computer-readable storage medium having stored therein instructions which, when executed by a processor of electronic equipment, allow the electronic equipment to implement a control method. The method includes:

acquiring at least two images;

acquiring at least two crop images by cropping the at least two images for face-containing images;

of the at least two crop images, performing triangular patch deformation on a first image and a second image that neighbour each other, generating a first triangular patch deformation frame image sequence from the first image to the second image, and a second triangular patch deformation frame image sequence from the second image to the first image;

performing similarity transformation on each image sequence of the first triangular patch deformation frame image sequence, acquiring a first transform frame image sequence;

performing similarity transformation on each image sequence of the second triangular patch deformation frame image sequence, acquiring a second transform frame image sequence;

fusing the first transform frame image sequence and the second transform frame image sequence, acquiring a video frame sequence corresponding to the first image and the second image; and of the at least two crop images, coding a video frame sequence generated by all neighbour images, acquiring a destined video.

Optionally, acquiring the at least two crop images by cropping the at least two images for the face-containing images includes:

determining feature points of a face contained in the at least two images;

determining a first region based on the feature points for the face-containing images in the at least two images; and acquiring the at least two crop images by cropping the face-containing images based on the first region.

Optionally, determining the first region based on the feature points includes:

determining a circumscription frame circumscribing the feature points according to location information of the feature points;

determining a width of the first region according to a center point of the circumscription frame and an image width boundary of the face to be processed; and determining a height of the first region according to a preset aspect ratio and the width of the first region.

Optionally, generating the first triangular patch deformation frame image sequence from the first image to the second image, and the second triangular patch deformation frame image sequence from the second image to the first image includes:

computing, according to a first coordinate set of feature points of a face of the first image and a second coordinate set of feature points of a face of the second image, a second similarity transformation matrix and a first similarity transformation matrix between the first coordinate set and the second coordinate set;

determining a first location difference between a feature point of the first image transformed by the first similarity transformation matrix and a corresponding feature point of the second image; determining a second location difference between a feature point of the second image transformed by the second similarity transformation matrix and a corresponding feature point of the first image;

computing a first feature point location track from the first image to the second image according to the first location difference; computing a second feature point location track from the second image to the first image according to the second location difference;

acquiring the first triangular patch deformation frame image sequence according to the first feature point location track, and acquiring the second triangular patch deformation frame image sequence according to the second feature point location track.

Optionally, computing the first feature point location track from the first image to the second image according to the first location difference includes:

computing the first feature point location track as:

$$s_{i:A \to B} = \frac{1}{N} \times D_{A \to B} + s_A.$$

The $s_{i:A \to B}$ is the first feature point location track, the N is a number of transform frames transforming the first image into the second image, the i is an ith frame image in transform image frames, the i is an integer greater than 0 and less than or equal to the N, the $s_A$ is the first coordinate set, and the $D_{A \to B}$ is the first location difference.

Computing the second feature point location track from the second image to the first image according to the second location difference may include:

computing the second feature point location track as:

$$s_{i:B \to A} = \frac{1}{N} \times D_{B \to A} + s_B.$$

The $s_{i:B \to A}$ is the second feature point location track, the $s_B$ is the second coordinate set, and the $D_{B \to A}$ is the second location difference.

Optionally, performing similarity transformation on each image sequence of the first triangular patch deformation frame image sequence, acquiring the first transform frame image sequence includes:

determining a first similarity transformation matrix transforming the first image into the second image;

determining a step interval of a first transform parameter of the first similarity transformation matrix according to a number of transform frames transforming the first image into the second image;

computing a first similarity transformation sub-matrix for each transform frame image sequence of the first transform frame image sequence based on the first similarity transformation matrix and the step interval of the first transform parameter; and acquiring the first transform frame image sequence by performing multiplication on each triangular patch deformation frame image in the first triangular patch deformation frame image sequence according to the first similarity transformation sub-matrix.

Additionally or alternatively, performing similarity transformation on each image sequence of the second triangular patch deformation frame image sequence, acquiring the second transform frame image sequence includes:

determining a second similarity transformation matrix transforming the second image into the first image;

determining a step interval of a second transform parameter of the second similarity transformation matrix according to a number of transform frames transforming the second image into the first image;

computing a second similarity transformation sub-matrix for each transform frame image sequence of the second transform frame image sequence based on the second similarity transformation matrix and the step interval of the second transform parameter; and acquiring the second transformation frame image sequence by performing multiplication on each triangular patch deformation frame image in the second triangular patch deformation frame image sequence according to the second similarity transformation sub-matrix.

Optionally, fusing the first transform frame image sequence and the second transform frame image sequence, acquiring the video frame sequence corresponding to the first image and the second image includes:

determining a first weight and a second weight, the first weight being a weight of an ith frame image of the first transform frame image sequence during fusion, the second weight being a weight of an ith frame image of the second transform frame image sequence during fusion, the i being greater than 0 and less than or equal to a number of frames of the first transform frame image sequence;

multiplying each pixel of the ith frame image of the first transform frame image sequence by the first weight, acquiring a first to-be-fused image; multiplying the ith frame image of the second transform frame image sequence by the second weight, acquiring a second to-be-fused image; and respectively superimposing each pixel in the first to-be-fused image and each pixel in the second to-be-fused image, acquiring an ith frame fusion image corresponding to the ith frame image of the first transform frame image sequence and the ith frame image of the second transform frame image sequence.

All fusion images corresponding to the first transform frame image sequence and the second transform frame image sequence may form the video frame sequence.

Optionally, the feature points include at least one of:

an eye, a nose tip, a mouth corner point, an eyebrow, a cheek, and a contour point of an eye, a nose, lips, an eyebrow, and a cheek.

Further note that although in drawings herein operations are described in a specific order, it should not be construed as that the operations have to be performed in the specific order or sequence, or that any operation shown has to be performed in order to acquire an expected result. Under a specific circumstance, multitask and parallel processing may be advantageous.

Other implementations of the present disclosure will be apparent to a person having ordinary skill in the art that has deemed the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the examples are intended to be illustrative only.

It should be understood that the present disclosure is not limited to the exact construction that has been described above and illustrated in the accompanying drawings, and that various modifications and changes may be made to the present disclosure without departing from the scope of the present disclosure.

According to a first aspect of examples of the present disclosure, there is provided a method for processing an image, including:

acquiring at least two images;

acquiring at least two crop images by cropping the at least two images for face-containing images;

of the at least two crop images, performing triangular patch deformation on a first image and a second image that neighbour each other, generating a first triangular patch deformation frame image sequence from the first image to the second image, and a second triangular patch deformation frame image sequence from the second image to the first image;

performing similarity transformation on each image sequence of the first triangular patch deformation frame image sequence, acquiring a first transform frame image sequence;

performing similarity transformation on each image sequence of the second triangular patch deformation frame image sequence, acquiring a second transform frame image sequence;

fusing the first transform frame image sequence and the second transform frame image sequence, acquiring a video frame sequence corresponding to the first image and the second image; and of the at least two crop images, coding a video frame sequence generated by all neighbour images, acquiring a destined video.

Optionally, acquiring the at least two crop images by cropping the at least two images for the face-containing images includes:

determining feature points of a face contained in the at least two images;

determining a first region based on the feature points for the face-containing images in the at least two images; and acquiring the at least two crop images by cropping the face-containing images based on the first region.

Optionally, determining the first region based on the feature points includes:

determining a circumscription frame circumscribing the feature points according to location information of the feature points;

determining a width of the first region according to a center point of the circumscription frame and an image width boundary of the face to be processed; and determining a height of the first region according to a preset aspect ratio and the width of the first region.

Optionally, generating the first triangular patch deformation frame image sequence from the first image to the second image, and the second triangular patch deformation frame image sequence from the second image to the first image includes:

computing, according to a first coordinate set of feature points of a face of the first image and a second coordinate set of feature points of a face of the second image, a second similarity transformation matrix and a first similarity transformation matrix between the first coordinate set and the second coordinate set;

determining a first location difference between a feature point of the first image transformed by the first similarity transformation matrix and a corresponding feature point of the second image; determining a second location difference between a feature point of the second image transformed by the second similarity transformation matrix and a corresponding feature point of the first image;

computing a first feature point location track from the first image to the second image according to the first location difference; computing a second feature point location track from the second image to the first image according to the second location difference;

acquiring the first triangular patch deformation frame image sequence according to the first feature point location track, and acquiring the second triangular patch deformation frame image sequence according to the second feature point location track.

Optionally, computing the first feature point location track from the first image to the second image according to the first location difference includes:

computing the first feature point location track as:

$$s_{i:A \to B} = \frac{1}{N} \times D_{A \to B} + s_A.$$

The $s_{i:A \to B}$ is the first feature point location track, the N is a number of transform frames transforming the first image into the second image, the i is an ith frame image in transform image frames, the i is an integer greater than 0 and less than or equal to the N, the $s_A$ is the first coordinate set, and the $D_{A \to B}$ is the first location difference.

Computing the second feature point location track from the second image to the first image according to the second location difference may include:

computing the second feature point location track as:
the second feature point location track $$s_{i:B \to A} = \frac{1}{N} \times D_{B \to A} + s_B.$$

The $s_{i:B \to A}$ is the second feature point location track, the $s_B$ is the second coordinate set, and the $D_{B \to A}$ is the second location difference.

Optionally, performing similarity transformation on each image sequence of the first triangular patch deformation frame image sequence, acquiring the first transform frame image sequence includes:

determining a first similarity transformation matrix transforming the first image into the second image;

determining a step interval of a first transform parameter of the first similarity transformation matrix according to a number of transform frames transforming the first image into the second image;

computing a first similarity transformation sub-matrix for each transform frame image sequence of the first transform frame image sequence based on the first similarity transformation matrix and the step interval of the first transform parameter; and acquiring the first transform frame image sequence by performing multiplication on each triangular patch deformation frame image in the first triangular patch deformation frame image sequence according to the first similarity transformation sub-matrix.

Optionally, performing similarity transformation on each image sequence of the second triangular patch deformation frame image sequence, acquiring the second transform frame image sequence includes:

acquiring a second similarity transformation sub-matrix by performing inverse transformation on the first similarity transformation sub-matrix; and acquiring the second transformation frame image sequence by performing multiplication on each triangular patch deformation frame image in the second triangular patch deformation frame image sequence according to the second similarity transformation sub-matrix, or determining a second similarity transformation matrix transforming the second image into the first image;

determining a step interval of a second transform parameter of the second similarity transformation matrix according to a number of transform frames transforming the second image into the first image;

computing a second similarity transformation sub-matrix for each transform frame image sequence of the second transform frame image sequence based on the second similarity transformation matrix and the step interval of the second transform parameter; and acquiring the second transformation frame image sequence by performing multiplication on each triangular patch deformation frame image in the second triangular patch deformation frame image sequence according to the second similarity transformation sub-matrix.

Optionally, fusing the first transform frame image sequence and the second transform frame image sequence, acquiring the video frame sequence corresponding to the first image and the second image includes:

determining a first weight and a second weight, the first weight being a weight of an ith frame image of the first transform frame image sequence during fusion, the second weight being a weight of an ith frame image of the second transform frame image sequence during fusion, the i being greater than 0 and less than or equal to a number of frames of the first transform frame image sequence;

multiplying each pixel of the ith frame image of the first transform frame image sequence by the first weight, acquiring a first to-be-fused image; multiplying the ith frame image of the second transform frame image sequence by the second weight, acquiring a second to-be-fused image; and respectively superimposing each pixel in the first to-be-fused image and each pixel in the second to-be-fused image, acquiring an ith frame fusion image corresponding to the ith frame image of the first transform frame image sequence and the ith frame image of the second transform frame image sequence.

All fusion images corresponding to the first transform frame image sequence and the second transform frame image sequence may form the video frame sequence.

According to a second aspect of examples of the present disclosure, there is provided a device for processing an image, including:

an acquiring unit configured to acquire at least two images;

a cropping unit configured to acquire at least two crop images by cropping the at least two images for face-containing images;

a triangular patch deformation unit configured to, of the at least two crop images, perform triangular patch deformation on a first image and a second image that neighbour each other, generating a first triangular patch deformation frame image sequence from the first image to the second image, and a second triangular patch deformation frame image sequence from the second image to the first image;

a similarity transformation unit configured to perform similarity transformation on each image sequence of the first triangular patch deformation frame image sequence, acquiring a first transform frame image sequence; and perform similarity transformation on each image sequence of the second triangular patch deformation frame image sequence, acquiring a second transform frame image sequence;

a fusing unit configured to fuse the first transform frame image sequence and the second transform frame image sequence, acquiring a video frame sequence corresponding to the first image and the second image; and a video generating unit configured to, of the at least two crop images, code a video frame sequence generated by all neighbour images, acquiring a destined video.

Optionally, the cropping unit is further configured to:

determine feature points of a face contained in the at least two images;

determine a first region based on the feature points for the face-containing images in the at least two images; and acquire the at least two crop images by cropping the face-containing images based on the first region.

Optionally, the cropping unit is further configured to:

determine a circumscription frame circumscribing the feature points according to location information of the feature points;

determine a width of the first region according to a center point of the circumscription frame and an image width boundary of the face to be processed; and determine a height of the first region according to a preset aspect ratio and the width of the first region.

Optionally, the triangular patch deformation unit is further configured to:

compute, according to a first coordinate set of feature points of a face of the first image and a second coordinate set of feature points of a face of the second image, a second similarity transformation matrix and a first similarity transformation matrix between the first coordinate set and the second coordinate set;

determine a first location difference between a feature point of the first image transformed by the first similarity transformation matrix and a corresponding feature point of the second image; and determine a second location difference between a feature point of the second image transformed by the second similarity transformation matrix and a corresponding feature point of the first image;

compute a first feature point location track from the first image to the second image according to the first location difference; and compute a second feature point location track from the second image to the first image according to the second location difference; and acquire the first triangular patch deformation frame image sequence according to the first feature point location track, and acquire the second triangular patch deformation frame image sequence according to the second feature point location track.

Optionally, the similarity transformation unit is further configured to:

determine a first similarity transformation matrix transforming the first image into the second image;

determine a step interval of a first transform parameter of the first similarity transformation matrix according to a number of transform frames transforming the first image into the second image;

compute a first similarity transformation sub-matrix for each transform frame image sequence of the first transform frame image sequence based on the first similarity transformation matrix and the step interval of the first transform parameter; and acquire the first transform frame image sequence by performing multiplication on each triangular patch deformation frame image in the first triangular patch deformation frame image sequence according to the first similarity transformation sub-matrix.

Optionally, the similarity transformation unit is further configured to:

acquire a second similarity transformation sub-matrix by performing inverse transformation on the first similarity transformation sub-matrix; and acquire the second transformation frame image sequence by performing multiplication on each triangular patch deformation frame image in the second triangular patch deformation frame image sequence according to the second similarity transformation sub-matrix, or determine a second similarity transformation matrix transforming the second image into the first image; determine a step interval of a second transform parameter of the second similarity transformation matrix according to a number of transform frames transforming the second image into the first image; compute a second similarity transformation sub-matrix for each transform frame image sequence of the second transform frame image sequence based on the second similarity transformation matrix and the step interval of the second transform parameter; and acquire the second transformation frame image sequence by performing multiplication on each triangular patch deformation frame image in the second triangular patch deformation frame image sequence according to the second similarity transformation sub-matrix.

Optionally, the fusing unit is further configured to:

determine a first weight and a second weight, the first weight being a weight of an ith frame image of the first transform frame image sequence during fusion, the second weight being a weight of an ith frame image of the second transform frame image sequence during fusion, the i being greater than 0 and less than or equal to a number of frames of the first transform frame image sequence;

multiply each pixel of the ith frame image of the first transform frame image sequence by the first weight, acquiring a first to-be-fused image; multiply the ith frame image of the second transform frame image sequence by the second weight, acquiring a second to-be-fused image; and respectively superimpose each pixel in the first to-be-fused image and each pixel in the second to-be-fused image, acquiring an ith frame fusion image corresponding to the ith frame image of the first transform frame image sequence and the ith frame image of the second transform frame image sequence.

All fusion images corresponding to the first transform frame image sequence and the second transform frame image sequence may form the video frame sequence.

According to a third aspect of examples of the present disclosure, there is provided electronic equipment including a processor and a memory for storing processor executable instructions. The processor is configured to implement a step of the method for processing an image by calling the executable instructions in the memory.

According to a fourth aspect of examples of the present disclosure, there is provided a non-transitory computer-readable storage medium having stored therein instructions which, when executed by a processor of electronic equipment, allow the electronic equipment to implement a step of the method for processing an image.

A technical solution provided by examples of the present disclosure may include beneficial effects as follows.

In examples of the present disclosure, a face of a portrait to be transformed is cropped. Then, triangular patch deformation is performed. Similarity transformation is performed on each image sequence in the deformation frame image sequence, avoiding an error and a jitter of an image transform frame, improving quality of the face transform video, improving face transform stability, improving user experience greatly.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

What is claimed is:

1. A method for processing an image, comprising:
acquiring at least two images;
acquiring at least two crop images by cropping the at least two images for face-containing images;
of the at least two crop images, performing triangular patch deformation on a first image and a second image that neighbour each other, generating a first triangular patch deformation frame image sequence from the first image to the second image, and a second triangular patch deformation frame image sequence from the second image to the first image;
performing similarity transformation on each image sequence of the first triangular patch deformation frame image sequence, acquiring a first transform frame image sequence;
performing similarity transformation on each image sequence of the second triangular patch deformation frame image sequence, acquiring a second transform frame image sequence;
fusing the first transform frame image sequence and the second transform frame image sequence, acquiring a video frame sequence corresponding to the first image and the second image; and
of the at least two crop images, coding a video frame sequence generated by all neighbour images, acquiring a destined video.

2. The method of claim 1, wherein acquiring the at least two crop images by cropping the at least two images for the face-containing images comprises:
determining feature points of a face contained in the at least two images;
determining a first region based on the feature points for the face-containing images in the at least two images; and
acquiring the at least two crop images by cropping the face-containing images based on the first region.

3. The method of claim 2, wherein determining the first region based on the feature points comprises:
determining a circumscription frame circumscribing the feature points according to location information of the feature points;

determining a width of the first region according to a center point of the circumscription frame and an image width boundary of the face to be processed; and
determining a height of the first region according to a preset aspect ratio and the width of the first region.

4. The method of claim 1, wherein generating the first triangular patch deformation frame image sequence from the first image to the second image, and the second triangular patch deformation frame image sequence from the second image to the first image comprises:
computing, according to a first coordinate set of feature points of a face of the first image and a second coordinate set of feature points of a face of the second image, a second similarity transformation matrix and a first similarity transformation matrix between the first coordinate set and the second coordinate set;
determining a first location difference between a feature point of the first image transformed by the first similarity transformation matrix and a corresponding feature point of the second image; determining a second location difference between a feature point of the second image transformed by the second similarity transformation matrix and a corresponding feature point of the first image;
computing a first feature point location track from the first image to the second image according to the first location difference; computing a second feature point location track from the second image to the first image according to the second location difference; and
acquiring the first triangular patch deformation frame image sequence according to the first feature point location track, and acquiring the second triangular patch deformation frame image sequence according to the second feature point location track.

5. The method of claim 4, wherein:
computing the first feature point location track from the first image to the second image according to the first location difference comprises:
computing the first feature point location track as:

$$s_{i:A \to B} = \frac{1}{N} \times D_{A \to B} + s_A,$$

wherein the $s_{i:A \to B}$ is the first feature point location track, the N is a number of transform frames transforming the first image into the second image, the i is an ith frame image in transform image frames, the i is an integer greater than 0 and less than or equal to the N, the $s_A$ is the first coordinate set, and the $D_{A \to B}$ is the first location difference, and
computing the second feature point location track from the second image to the first image according to the second location difference comprises:
computing the second feature point location track as:

$$s_{i:B \to A} = \frac{1}{N} \times D_{B \to A} + s_B,$$

wherein the $s_{i:B \to A}$ is the second feature point location track, the $s_B$ is the second coordinate set, and the $D_{B \to A}$ is the second location difference.

6. The method of claim 1, wherein performing similarity transformation on each image sequence of the first triangular patch deformation frame image sequence, acquiring the first transform frame image sequence comprises:
  determining a first similarity transformation matrix transforming the first image into the second image;
  determining a step interval of a first transform parameter of the first similarity transformation matrix according to a number of transform frames transforming the first image into the second image;
  computing a first similarity transformation sub-matrix for each transform frame image sequence of the first transform frame image sequence based on the first similarity transformation matrix and the step interval of the first transform parameter; and
  acquiring the first transform frame image sequence by performing multiplication on each triangular patch deformation frame image in the first triangular patch deformation frame image sequence according to the first similarity transformation sub-matrix.

7. The method of claim 6, wherein performing similarity transformation on each image sequence of the second triangular patch deformation frame image sequence, acquiring the second transform frame image sequence comprises:
  acquiring a second similarity transformation sub-matrix by performing inverse transformation on the first similarity transformation sub-matrix; and acquiring the second transformation frame image sequence by performing multiplication on each triangular patch deformation frame image in the second triangular patch deformation frame image sequence according to the second similarity transformation sub-matrix.

8. The method of claim 1, wherein performing similarity transformation on each image sequence of the second triangular patch deformation frame image sequence, acquiring the second transform frame image sequence comprises:
  determining a second similarity transformation matrix transforming the second image into the first image;
  determining a step interval of a second transform parameter of the second similarity transformation matrix according to a number of transform frames transforming the second image into the first image;
  computing a second similarity transformation sub-matrix for each transform frame image sequence of the second transform frame image sequence based on the second similarity transformation matrix and the step interval of the second transform parameter; and
  acquiring the second transformation frame image sequence by performing multiplication on each triangular patch deformation frame image in the second triangular patch deformation frame image sequence according to the second similarity transformation sub-matrix.

9. The method of claim 1, wherein fusing the first transform frame image sequence and the second transform frame image sequence, acquiring the video frame sequence corresponding to the first image and the second image comprises:
  determining a first weight and a second weight, wherein the first weight is a weight of an ith frame image of the first transform frame image sequence during fusion, and the second weight is a weight of an ith frame image of the second transform frame image sequence during fusion, wherein the i is greater than 0 and less than or equal to a number of frames of the first transform frame image sequence;
  multiplying each pixel of the ith frame image of the first transform frame image sequence by the first weight, acquiring a first to-be-fused image; multiplying the ith frame image of the second transform frame image sequence by the second weight, acquiring a second to-be-fused image; and
  respectively superimposing each pixel in the first to-be-fused image and each pixel in the second to-be-fused image, acquiring an ith frame fusion image corresponding to the ith frame image of the first transform frame image sequence and the ith frame image of the second transform frame image sequence, and
  wherein all fusion images corresponding to the first transform frame image sequence and the second transform frame image sequence form the video frame sequence.

10. Electronic equipment comprising a processor and a memory for storing processor executable instructions, wherein the processor is configured, by calling the executable instructions in the memory, to implement:
  acquiring at least two images;
  acquiring at least two crop images by cropping the at least two images for face-containing images;
  of the at least two crop images, performing triangular patch deformation on a first image and a second image that neighbour each other, generating a first triangular patch deformation frame image sequence from the first image to the second image, and a second triangular patch deformation frame image sequence from the second image to the first image;
  performing similarity transformation on each image sequence of the first triangular patch deformation frame image sequence, acquiring a first transform frame image sequence;
  performing similarity transformation on each image sequence of the second triangular patch deformation frame image sequence, acquiring a second transform frame image sequence;
  fusing the first transform frame image sequence and the second transform frame image sequence, acquiring a video frame sequence corresponding to the first image and the second image; and
  of the at least two crop images, coding a video frame sequence generated by all neighbour images, acquiring a destined video.

11. The electronic equipment of claim 10, wherein the processor configured to implement acquiring the at least two crop images by cropping the at least two images for the face-containing is further configured to implement:
  determining feature points of a face contained in the at least two images;
  determining a first region based on the feature points for the face-containing images in the at least two images; and
  acquiring the at least two crop images by cropping the face-containing images based on the first region.

12. The electronic equipment of claim 11, wherein the processor configured to implement determining the first region based on the feature points is further configured to implement:
  determining a circumscription frame circumscribing the feature points according to location information of the feature points;
  determining a width of the first region according to a center point of the circumscription frame and an image width boundary of the face to be processed; and
  determining a height of the first region according to a preset aspect ratio and the width of the first region.

13. The electronic equipment of claim 10, wherein the processor configured to implement generating the first triangular patch deformation frame image sequence from the first image to the second image, and the second triangular patch deformation frame image sequence from the second image to the first image, is further configured to implement:

computing, according to a first coordinate set of feature points of a face of the first image and a second coordinate set of feature points of a face of the second image, a second similarity transformation matrix and a first similarity transformation matrix between the first coordinate set and the second coordinate set;

determining a first location difference between a feature point of the first image transformed by the first similarity transformation matrix and a corresponding feature point of the second image; determining a second location difference between a feature point of the second image transformed by the second similarity transformation matrix and a corresponding feature point of the first image;

computing a first feature point location track from the first image to the second image according to the first location difference; computing a second feature point location track from the second image to the first image according to the second location difference; and acquiring the first triangular patch deformation frame image sequence according to the first feature point location track, and acquiring the second triangular patch deformation frame image sequence according to the second feature point location track.

14. The electronic equipment of claim 13, wherein:

the processor configured to implement computing the first feature point location track from the first image to the second image according to the first location difference is further configured to implement:

computing the first feature point location track as:

$$s_{i:A \to B} = \frac{1}{N} \times D_{A \to B} + s_A,$$

wherein the $s_{i:A \to B}$ is the first feature point location track, the N is a number of transform frames transforming the first image into the second image, the i is an ith frame image in transform image frames, the i is an integer greater than 0 and less than or equal to the N, the $s_A$ is the first coordinate set, and the $D_{A \to B}$ is the first location difference, and the processor configured to implement computing the second feature point location track from the second image to the first image according to the second location difference is further configured to implement:

computing the second feature point location track as:

$$s_{i:B \to A} = \frac{1}{N} \times D_{B \to A} + s_B,$$

wherein the $s_{i:B \to A}$ is the second feature point location track, the $s_B$ is the second coordinate set, and the $D_{B \to A}$ is the second location difference.

15. The electronic equipment of claim 10, wherein the processor configured to implement performing similarity transformation on each image sequence of the first triangular patch deformation frame image sequence, acquiring the first transform frame image sequence, is further configured to implement:

determining a first similarity transformation matrix transforming the first image into the second image;

determining a step interval of a first transform parameter of the first similarity transformation matrix according to a number of transform frames transforming the first image into the second image;

computing a first similarity transformation sub-matrix for each transform frame image sequence of the first transform frame image sequence based on the first similarity transformation matrix and the step interval of the first transform parameter; and acquiring the first transform frame image sequence by performing multiplication on each triangular patch deformation frame image in the first triangular patch deformation frame image sequence according to the first similarity transformation sub-matrix.

16. The electronic equipment of claim 15, wherein the processor configured to implement performing similarity transformation on each image sequence of the second triangular patch deformation frame image sequence, acquiring the second transform frame image sequence, is further configured to implement:

acquiring a second similarity transformation sub-matrix by performing inverse transformation on the first similarity transformation sub-matrix; and acquiring the second transformation frame image sequence by performing multiplication on each triangular patch deformation frame image in the second triangular patch deformation frame image sequence according to the second similarity transformation sub-matrix.

17. The electronic equipment of claim 10, wherein the processor configured to implement performing similarity transformation on each image sequence of the second triangular patch deformation frame image sequence, acquiring the second transform frame image sequence, is further configured to implement:

determining a second similarity transformation matrix transforming the second image into the first image;

determining a step interval of a second transform parameter of the second similarity transformation matrix according to a number of transform frames transforming the second image into the first image;

computing a second similarity transformation sub-matrix for each transform frame image sequence of the second transform frame image sequence based on the second similarity transformation matrix and the step interval of the second transform parameter; and acquiring the second transformation frame image sequence by performing multiplication on each triangular patch deformation frame image in the second triangular patch deformation frame image sequence according to the second similarity transformation sub-matrix.

18. The electronic equipment of claim 10, wherein the processor configured to implement fusing the first transform frame image sequence and the second transform frame image sequence, acquiring the video frame sequence corresponding to the first image and the second image, is further configured to implement:

determining a first weight and a second weight, wherein the first weight is a weight of an ith frame image of the first transform frame image sequence during fusion, and the second weight is a weight of an ith frame image of the second transform frame image sequence during fusion, wherein the i is greater than 0 and less than or equal to a number of frames of the first transform frame image sequence;

multiplying each pixel of the ith frame image of the first transform frame image sequence by the first weight, acquiring a first to-be-fused image; multiplying the ith frame image of the second transform frame image sequence by the second weight, acquiring a second to-be-fused image; and respectively superimposing each pixel in the first to-be-fused image and each pixel in the second to-be-fused image, acquiring an ith frame fusion image corresponding to the ith frame image of the first transform frame image sequence and the ith frame image of the second transform frame image sequence, and wherein all fusion images corresponding to the first transform frame image sequence and the second transform frame image sequence form the video frame sequence.

19. A non-transitory computer-readable storage medium having stored therein instructions which, when executed by a processor of electronic equipment, cause the electronic equipment to implement:

acquiring at least two images;

acquiring at least two crop images by cropping the at least two images for face-containing images;

of the at least two crop images, performing triangular patch deformation on a first image and a second image that neighbour each other, generating a first triangular patch deformation frame image sequence from the first image to the second image, and a second triangular patch deformation frame image sequence from the second image to the first image;

performing similarity transformation on each image sequence of the first triangular patch deformation frame image sequence, acquiring a first transform frame image sequence;

performing similarity transformation on each image sequence of the second triangular patch deformation frame image sequence, acquiring a second transform frame image sequence;

fusing the first transform frame image sequence and the second transform frame image sequence, acquiring a video frame sequence corresponding to the first image and the second image; and of the at least two crop images, coding a video frame sequence generated by all neighbour images, acquiring a destined video.

20. The storage medium of claim 19, wherein the instructions caused the processor to implement acquiring the at least two crop images by cropping the at least two images for the face-containing images further cause the processor to implement:

determining feature points of a face contained in the at least two images;

determining a first region based on the feature points for the face-containing images in the at least two images; and acquiring the at least two crop images by cropping the face-containing images based on the first region.

\* \* \* \* \*